(12) United States Patent
Zheng et al.

(10) Patent No.: US 11,830,081 B2
(45) Date of Patent: Nov. 28, 2023

(54) AUTOMATED RETURN EVALUATION WITH ANOMOLY DETECTION

(71) Applicant: HRB Innovations, Inc., Las Vegas, NV (US)

(72) Inventors: Zhi Zheng, Lawrence, KS (US); Jason N. Ward, Lee's Summit, MO (US); Benjamin A. Kite, Lawrence, KS (US)

(73) Assignee: HRB Innovations, Inc., Wilmington, DE (US)

( * ) Notice: Subject to any disclaimer, the term of this patent is extended or adjusted under 35 U.S.C. 154(b) by 0 days.

(21) Appl. No.: 17/394,199

(22) Filed: Aug. 4, 2021

(65) Prior Publication Data
US 2023/0039971 A1 Feb. 9, 2023

(51) Int. Cl.
*G06Q 40/10* (2023.01)
*G06N 3/08* (2023.01)
*G06Q 40/12* (2023.01)
*G06Q 50/26* (2012.01)

(52) U.S. Cl.
CPC .............. *G06Q 40/10* (2013.01); *G06N 3/08* (2013.01); *G06Q 40/12* (2013.12); *G06Q 50/26* (2013.01)

(58) Field of Classification Search
None
See application file for complete search history.

(56) References Cited

U.S. PATENT DOCUMENTS

| | | | | |
|---|---|---|---|---|
| 5,740,274 | A * | 4/1998 | Ono | G06T 7/73 382/156 |
| 6,728,404 | B1 * | 4/2004 | Ono | G06T 7/246 382/156 |
| 7,840,569 | B2 * | 11/2010 | Meyerzon | G06N 3/02 706/62 |
| 10,599,635 | B1 * | 3/2020 | Gunn | G06F 16/213 |
| 11,252,329 | B1 * | 2/2022 | Cier | G06V 10/454 |
| 2005/0080832 | A1 * | 4/2005 | Stuebe | A61B 5/053 708/400 |
| 2006/0147101 | A1 * | 7/2006 | Zhang | G06T 7/181 382/131 |
| 2010/0306249 | A1 * | 12/2010 | Hill | G06F 16/9535 707/769 |
| 2012/0290365 | A1 * | 11/2012 | Bramlett, Jr. | G06Q 10/1053 705/7.42 |

(Continued)

*Primary Examiner* — Fateh M Obaid
(74) *Attorney, Agent, or Firm* — Erise IP, P.A.

(57) ABSTRACT

Media, methods, and systems are disclosed for applying a computer-implemented model to a table of computed values to identify one or more anomalies. One or more input forms having a plurality of input form field values is received. The input form field values are automatically parsed into a set of computer-generated candidate standard field values. The set of candidate standard field values are automatically normalized into a corresponding set of normalized field values, based on a computer-automated input normalization model. An automated review model controller is applied to automatically identify a review model to apply to the set of normalized field values, based on certain predetermined target field values. The automatically identified review model is then applied to the set of normalized inputs, and in response to detecting an anomaly, a field value is flagged accordingly.

20 Claims, 5 Drawing Sheets

(56) References Cited

U.S. PATENT DOCUMENTS

| | | | | |
|---|---|---|---|---|
| 2014/0241631 A1* | 8/2014 | Huang | ............... | G06V 30/414 |
| | | | | 382/176 |
| 2014/0279636 A1* | 9/2014 | Bramlett, Jr. | ...... | G06Q 10/1053 |
| | | | | 705/321 |
| 2017/0258390 A1* | 9/2017 | Howard | ............... | A61B 5/369 |
| 2017/0286861 A1* | 10/2017 | Kelly | ............... | G06N 20/00 |
| 2019/0317844 A1* | 10/2019 | Gottschlich | ............ | G06F 9/544 |
| 2020/0201443 A1* | 6/2020 | Huang | ............... | G06V 30/32 |
| 2021/0089866 A1* | 3/2021 | Kolter | ............... | G06N 3/0454 |
| 2021/0097502 A1* | 4/2021 | Hilleli | ............... | G06N 3/0454 |
| 2021/0105565 A1* | 4/2021 | Pedersen | ............... | H04R 25/70 |
| 2021/0124920 A1* | 4/2021 | Stahlfeld | ............... | G06V 20/52 |
| 2021/0124988 A1* | 4/2021 | Kadowaki | ............ | G06K 9/6262 |
| 2021/0209304 A1* | 7/2021 | Yang | ............... | G10L 13/00 |
| 2021/0389997 A1* | 12/2021 | Ibrahim | ............ | G06F 11/3476 |
| 2022/0051433 A1* | 2/2022 | Sohn | ............... | G06T 7/73 |
| 2022/0230048 A1* | 7/2022 | Li | ............... | G06N 3/08 |
| 2022/0272035 A1* | 8/2022 | Bastug | ............... | H04L 43/0858 |

\* cited by examiner

AUTOMATED RETURN EVALUATION WITH ANOMOLY DETECTION

BACKGROUND

1. Field

Embodiments of the invention generally relate to systems for automating evaluation of actual or simulated tax returns and, more particularly, to the automated evaluation of components of one or more tax returns to employ anomaly detection to identify possible errors or opportunities for optimization.

2. Related Art

The process of preparing a tax return is notoriously complex and error prone. The complexity of the tax code means that simple questions can be surprisingly difficult to answer correctly. Furthermore, some questions have answers which are superficially correct, but which can result in errors in the return being prepared or in a smaller refund than the taxpayer would otherwise be entitled to.

To ensure correct returns and minimize tax liability for their users, makers of tax preparation systems seek provide automated review processes to identify errors in returns or opportunities to legally reduce calculated tax liability. Some systems review completed returns in an attempt to identify returns that need to be amended to be compliant or that could be amended to reduce taxes owed. Accordingly, there is a need for a tax return evaluation system that can automatically evaluate complete and/or proposed returns, identifying anomalies to predict possible errors in the return or opportunities for calculation optimization or other reductions in tax liability.

Embodiments of the invention relate to evaluating an actual or simulated calculation of compliance documentation such as tax returns and, more particularly, to review of particular compliance calculations under the application of a tax calculation framework.

SUMMARY

Embodiments of the invention address the above-identified problems by providing a mechanism for applying a computer-implemented model to a table of computed values to identify one or more anomalies in the table of computed values. In particular, in a first embodiment, the invention includes one or more non-transitory computer-readable media storing computer-executable instructions that, when executed by a processor, perform a method for applying a computer-implemented model to a table of computed values to identify one or more anomalies in the table of computed values, the method comprising: receiving one or more input forms, each of the one or more input forms comprising a plurality of input form field values, automatically parsing the plurality of input form field values into a set of computer-generated candidate standard field values, automatically normalizing the set of candidate standard field values into a corresponding set of normalized field values, based on a computer-automated input normalization model, applying an automated review model controller to automatically identify a review model to apply to the set of normalized field values, based on a predetermined one or more target field values in the set of normalized field values, applying the automatically identified review model to the set of normalized inputs, and in response to detecting one or more anomalies in the set of normalized field values, flagging a detected anomalous field value in the set of normalized field values.

In a second embodiment, the invention includes a method for applying a computer-implemented model to a table of computed values to identify one or more anomalies in the table of computed values, the method comprising: receiving one or more input forms, each of the one or more input forms comprising a plurality of input form field values, automatically parsing the plurality of input form field values into a set of computer-generated candidate standard field values, automatically normalizing the set of candidate standard field values into a corresponding set of normalized field values, based on a computer-automated input normalization model, applying an automated review model controller to automatically identify a review model to apply to the set of normalized field values, based on a predetermined one or more target field values in the set of normalized field values, applying the automatically identified review model to the set of normalized inputs, and in response to detecting one or more anomalies in the set of normalized field values, flagging a detected anomalous field value in the set of normalized field values.

In a third embodiment, the invention includes a system comprising at least one processor and at least one non-transitory memory storing computer executable instructions that when executed by the processor cause the system to carry out actions comprising: receiving one or more input forms, each of the one or more input forms comprising a plurality of input form field values, automatically parsing the plurality of input form field values into a set of computer-generated candidate standard field values, automatically normalizing the set of candidate standard field values into a corresponding set of normalized field values, based on a computer-automated input normalization model, applying an automated review model controller to automatically identify a review model to apply to the set of normalized field values, based on a predetermined one or more target field values in the set of normalized field values, applying the automatically identified review model to the set of normalized inputs, and in response to detecting one or more anomalies in the set of normalized field values, flagging a detected anomalous field value in the set of normalized field values.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

A series of models are applied to identify potential errors in preliminary or existing tax returns, trained on data collected from responses from subject-matter experts that identified and flagged errors or other anomalies in similar past returns. Anomaly detection is carried out using machine-learning models that are trained based on a corpus of inputs generated in connection with previous decisions based on subject-matter expertise. In various embodiments, the present teachings employ multiple models, therefore a model controller determines and selects an optimal and applies the selected model to a tax return to check for potential anomalies. In various embodiments, custom models are employed that are significantly influenced by subject-matter expert modeler expertise and intuition. Additionally driverless models are applied that are created automatically by a driverless model generation process that employs assumptions and general data science rules to automate the model generation process. In general, a driverless approach is used to build first iterations of models and custom models are applied as indicated, for example where driverless models are found to generate false positives or false negatives in terms of anomaly generation.

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

Figure 1:
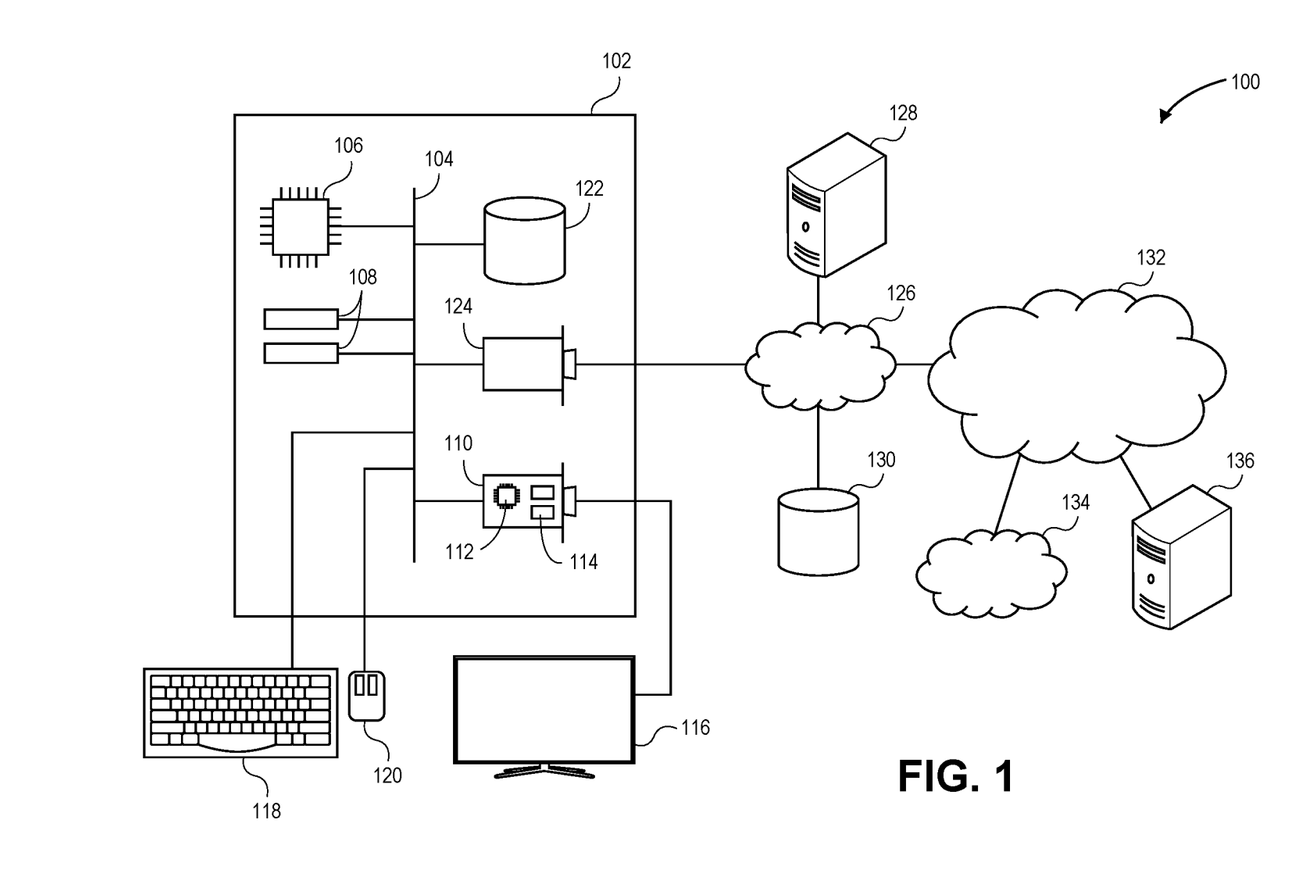
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

Figure 2A:
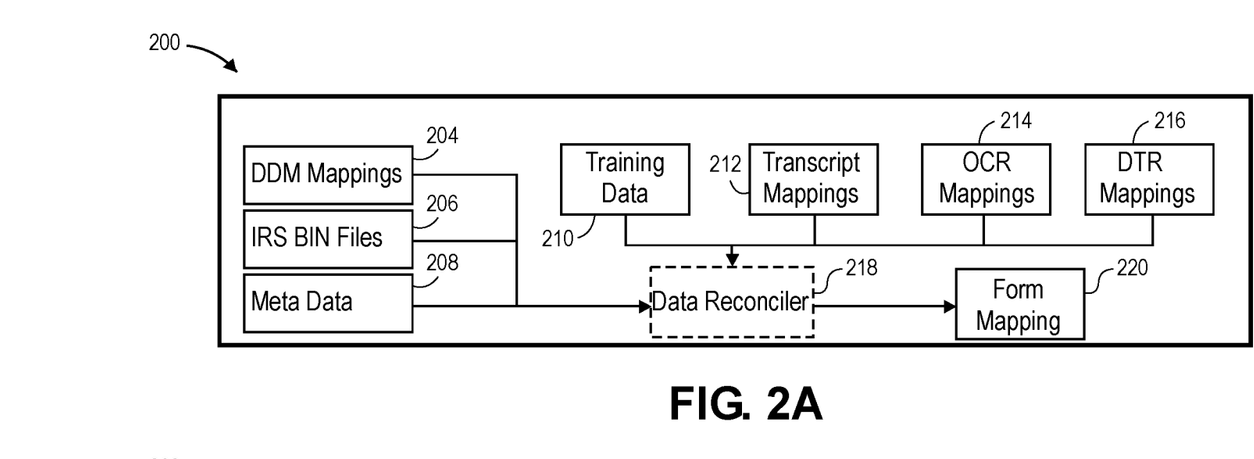
FIG. 2A depicts components of a system for computer-automated creation and updating of data form normalization mappings in embodiments of the invention.

Turning now to FIG. 2A, components of system 200 are depicted for computer-automated creation and updating of data form normalization mappings in embodiments of the invention. System 200 incorporates various data sources to ultimately produce form mapping 220 which can be used to make predictions of mappings from fields in various input documents to a set of standard normalized field values. Domain Data Model (DDM) mappings 204, IRS background information note (BIN) files 206, and tax-related metadata 208 are provided as inputs to data reconciler 218. In these embodiments DDM mappings, BIN files, and other tax-related metadata are regulatory agency data sources that provide information regarding tax return preparation. In addition to receiving metadata from these data sources, data reconciler 218 also receives information from training data 210. Training data 210 may include simulated data sources having known values based on real-world input sources received from various cohorts of taxpayers having known sources of input forms. Additionally, transcript mappings 212 provide a source of information to data reconciler 218 in the form of known values of variable names provided in IRS transcripts of tax returns and how the known variable names correspond to standard normalized field values.

Similarly, OCR mappings 214 are provided that include known values of variable names provided in real-world, processed OCR input forms and how the OCR-processed variable names correspond to standard normalized field values. In some embodiments Digital Tax Reporting (DTR) mappings 216 are provided to provide a source of context to data reconciler 218 in the form of known values of variable names provided in DTR input and how the corresponding variable names map to standard normalized field values. Given these source inputs, data reconciler 218 produces form mapping 220. In various embodiments, data reconciler 218 performs a series of joins to provide a name for each of the tax return lines in a particular training set. In some embodiments, a default name is first assumed according to a standard formatting. However, in a case where a standard assumed name is absent, other data sources are employed. Data reconciler 218 is used in the normalization process as further described below in connection with FIG. 2B. In various embodiments, data reconciler 218 combines the above-described metadata (sources 204-206 and 210-216) to create form mapping 220. In these embodiments, form mapping may be stored as a spreadsheet which describes how the various above-described data sources map to standard normalized field values. In some embodiments, the metadata sources described above may be obtained through APIs, and well as mappings provided by owners of the various sources of data (e.g., mappings of IRS transcript line names to DDM). In some such embodiments, past tax years are processed sequentially to reflect differences in historic variable naming and/or value formatting, and then all years are combined into a single file for use in production.

Figure 2B:
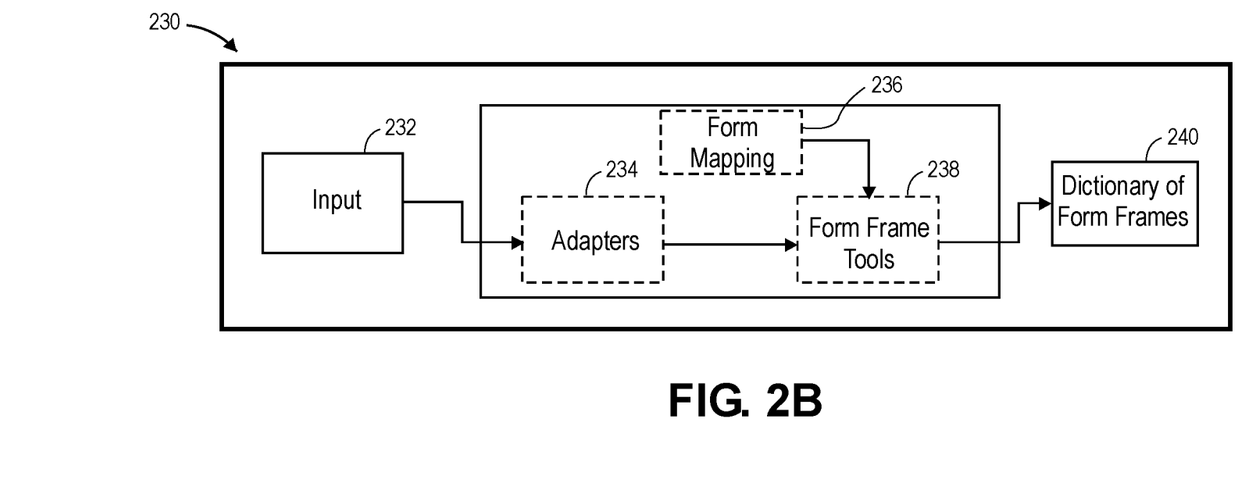
FIG. 2B depicts components of a system for automatically generating form frames that are responsible for carrying out data parsing and standardization in connection with the data form normalization mappings in embodiments of the invention.

Turning now to FIG. 2B, components of system 230 are depicted for generating form frames that are responsible for carrying out data parsing and standardization in connection with the data form normalization mappings in embodiments of the invention. In various embodiments, system 230 provides preprocessing functionality of data parsing and standardization of data field names and formatting of values. Typical sources of taxpayer electronic input documents frequently have varying data field or variable names corresponding to a particular input value as well as varying rules regarding a position of a particular data field within particular rows and columns of a data table containing taxpayer information.

In some embodiments, a systematic means is provided to standardize a taxpayer's input data so that arbitrary sources of taxpayer information can be fed into models for training and scoring consistent with the present teachings. After normalization by exemplary system 230, regardless of the input source, a standardized name and data format will be achieved for a particular variable. For example, regardless of whether a particular input source originates in the form of various versions of Internal Revenue System (IRS) transcripts, various HyperText Markup Language (HTML) sources, optical character recognition (OCR) of paper or electronic forms, etc., a form W2 line 4 will be the same in the normalized output. System 230 performs this normalization as further explained below using metadata obtained from prior tax returns, IRS data sources, and by processing the forms according to embodiments of the invention.

In various embodiments, incoming data forms taking the structure of input 232 are received by system 230. Next, adapters 234 process field values from input 232. Adapters 234 are a collection of functions for manipulating incoming data (.html, .json, etc.) to a data frame, which is a N×T table where N is the number of instances of a tax form and T is the number of lines on that form. Each row represents and individual form, so taxpayers having multiple W2s will have multiple rows in such a table. Adapters read various data sources and apply a series of manipulations to transform data in the aforementioned data frame into a table having appropriate column names. In parallel form mapping 236, which was derived as described above in FIG. 2A, provides input to form frame tools 238, which themselves also receive preprocessed input from adapters 234. Form frame tools 238 are a collection of functions used to standardize input 232 based on instructions contained in form mapping 236. In some embodiments, the instructions correspond to names to be applied to each column, and any corresponding necessary text transformation that needs to be performed. In some embodiments, such a text transformation may be specified in the form of a regular expression. In some embodiments, the instructions map one or more tax form input line names to a corresponding desired output tax form line name. Finally, dictionary of form frames 240 is produced, which has a structure in which keys are individual tax forms and each dictionary entry contains a form frame corresponding to that particular tax form.

Figure 3:
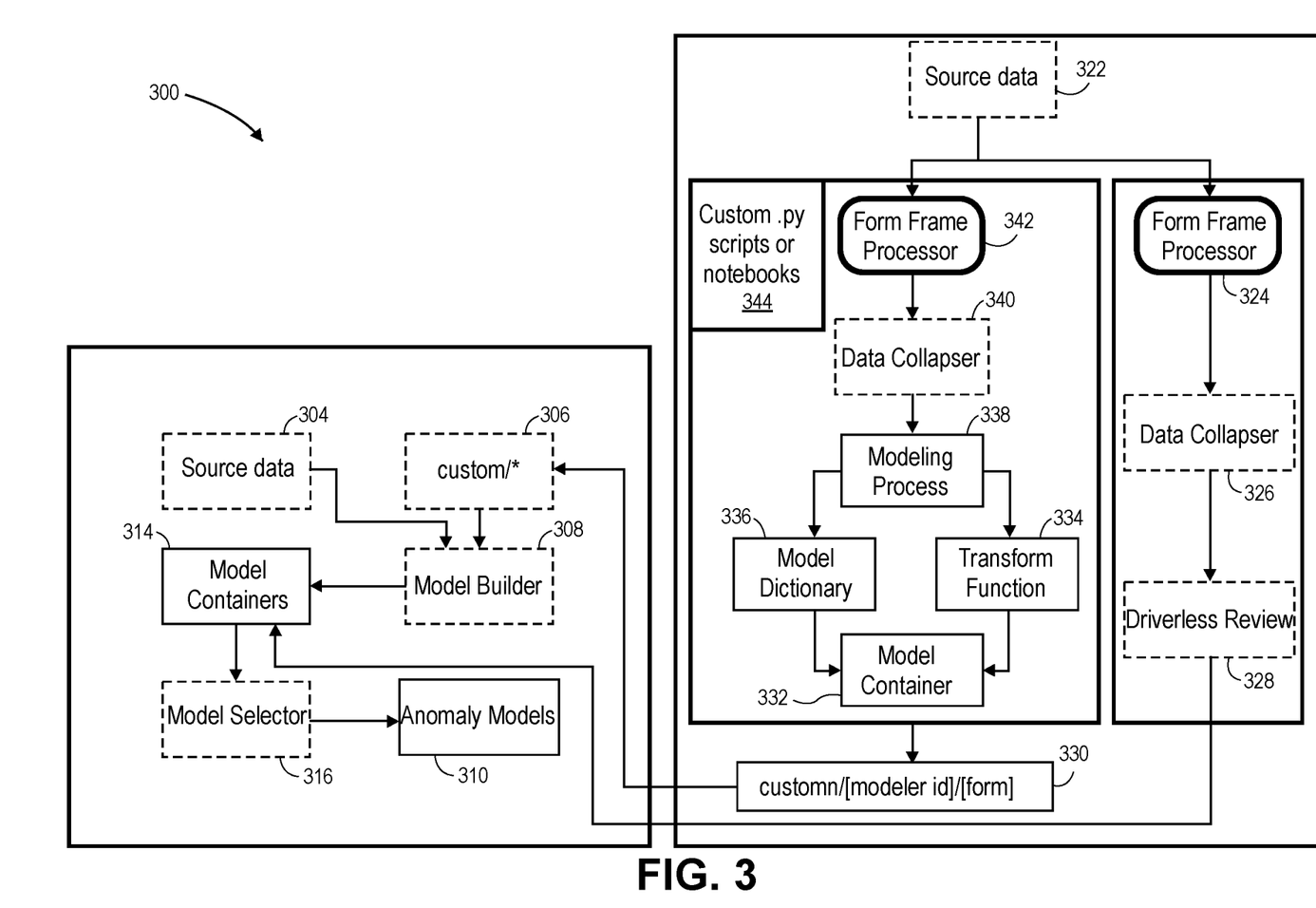
FIG. 3 depicts components of a system for carrying out anomaly model construction and selection in embodiments of the invention.

Turning now to FIG. 3, components of system 300 are depicted for carrying out anomaly model construction and selection, in embodiments of the invention. In various embodiments, anomaly models 310 are built and selected based on actual modeling performed in connection with system 300. In this way, anomaly models are iteratively refined. In various embodiments, source data 322 is received in the form of ad-hoc, arbitrary, non-preprocessed tax data corresponding to a particular set of input forms belonging to a particular taxpayer.

In some embodiments, source data 322 is processed in parallel to identify possible anomalies. In one parallel path, form frame processor 324 normalizes source data 322, as set forth above in connection with FIG. 2B. Next, data collapser 326 collapses a resulting form frame generated by form frame processor 324. In some embodiments, data collapser 326 is a custom adapter such as one of the adapters 234 from FIG. 2B that converts a form frame, for example, from dictionary of form frames 240 into a data frame, in which each taxpayer is represented on a single row, for example, if a taxpayer has multiple forms W2. In such an embodiment, values for the multiple forms W2 are summed together. Next, in this parallel path, the data frame is processed by driverless review 328. Driverless review is a collection of functions which automates the process of fitting, evaluating, and saving machine learning models. In some embodiments, driverless review may be used to quickly automate the modeling process and produce a large library of models. In some embodiments, for the automatic selection of a machine learning model, a best-fitting neural network may be selected from a plurality of candidate neural networks, the best-fitting neural network providing a best performance based on using known training data in connection with the plurality of candidate neural networks.

Automated modeling processes consistent with the present teachings can handle many divergent cases and allow contributing data scientists to focus on more complex modeling problems. Processing proceeds to model containers 314, where in some embodiments, the models are saved in custom python class instances in pickle files (using, e.g., cloudpickle). In some embodiments, these models are saved in a single directory within a file server associated with the processing. In these embodiments, the objects themselves possess adequate information to load and use the objects. Next, a model is selected at model selector 316 and metadata associated with the selection is added to a set of anomaly models 310. In some embodiments, model selector 316 determines which models created by contributors should be loaded into the tool based on test performance. In some embodiments, a large validation set is used to score with all possible models, and metrics, that were chosen a priori, determine which candidate models for a particular tax form line should be included in a production implementation.

In a second parallel path, form frame processor 342 normalizes source data 322, as set forth above in connection with FIG. 2B. Next, data collapser 340 collapses a resulting form frame generated by form frame processor 342. Next, modeling process 338 distributes model processing in parallel to model dictionary 336 and transform function 334. In some embodiments, this involves submitting a plurality of trained models in custom python classes, along with defined transform methods that prepare incoming data for scoring. Exemplary project packages create a custom model collection described as follows. Next, at block 332, a model container is formed and persisted as a custom model having a structure with a parameterized [modeler id] and [form] as indicated in block 330. This custom model is then provided to the set of custom models 306 in the anomaly build and selection process. From here, model builder 308 provides the custom model to model containers 314 and as in the first parallel path, processing proceeds to model containers 314, where a model is selected at model selector 316 and metadata associated with the selection is added to a set of anomaly models 310. In some embodiments, model builder 308 is responsible for building models using code provided by individual project contributors.

In some embodiments, subject matter experts write custom-developed models implemented as scripts that perform various steps. In some embodiments, the scripts are python-language scripts. First, the scripts take source data for training, pass it through a form frame processor to normalize the source data and then through a data collapser to convert the resulting form frame into a data frame. Next, the scripts create a modeling process from which a dictionary of trained models is produced, Next the scripts define a function that contains all the transformations necessary to carry out a particular modeling process. Finally, the custom scripts persist associated objects from the above steps a serialized object container such a python-language "pickle" file (.pkl file). In some embodiments, these scripts are saved in a directory assigned to each contributor and committed to source code control system project, such as a git repository.

In some embodiments, model builder is used to load all custom-built models and save them in .pkl files, then model selector choses the better performing collection of models for a wide variety of input scenarios. This process produces anomaly models. In various embodiments, values for lines on tax forms are predicted, and cases that differ greatly from their expected value generate an anomaly alert.

Figure 4:
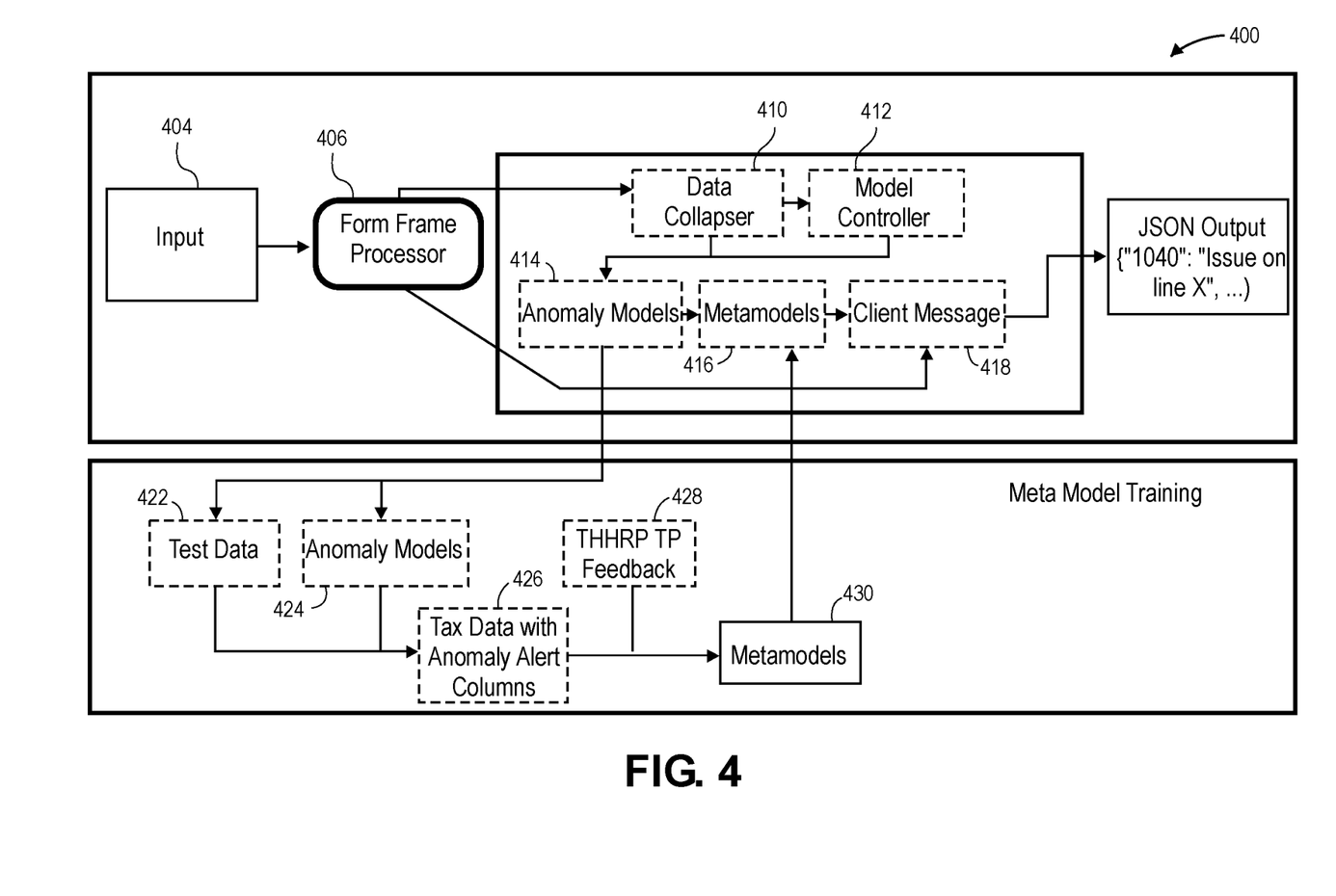
FIG. 4 depicts components of a system for carrying out anomaly detection in embodiments of the invention.

Turning now to FIG. 4, components of system 400 are depicted for carrying out anomaly detection in embodiments of the invention. In various embodiments, source data in the form of input 404 is received in the form of ad-hoc, arbitrary, non-preprocessed tax data corresponding to a particular set of input forms belonging to a particular taxpayer. In some embodiments, form frame processor 406 normalizes input 404, as set forth above in connection with FIG. 2B. Next, data collapser 410 collapses a resulting form frame generated by form frame processor 406. Next the resulting data frame is provided to model controller 412. Model controller 412 determines which model to apply based on a a large collection of available models. In these embodiments, model controller 412 is responsible for determining what models should be used based on the input provided. In some embodiments, this is determined based on which forms were provided in corresponding input data. In these embodiments, logic is applied to select certain models that both: (i) do not have any unobserved forms/lines as features; (ii) provide the most full-standing lines among the models that pass requirement (i). The list of models to use and the data frame from data collapser 410 are sent to anomaly models 414 for error detection, and to metamodels 416 if they are available. The model output is sent to client message 418 which builds a simple response in JSON format which outlines what potential anomalies were detected.

In various embodiments to train a model, actual "live" taxpayer data from a production flow are saved with information about alerts on individual columns appended. Information from expert judgement based on the review by a subject-matter expert on if tax returns should be amended is also appended. Models are trained to predict subject matter expert amendment recommendations based on flagged anomalies. Client message 418 is a message that is generated when modeling is complete these functions produce a response that will be returned to whatever application called the API. In some embodiments, metamodels are those models that are trained to predict whether a subject matter expert might rate a return as being problematic. Such a prediction may be used to create a feedback loop that prevents methods consistent with the present teachings from generating spurious predictions of improperly calculated returns. In some embodiments, exemplary models predict potentially improper calculations by flagging potential anomalies. In these embodiments, alternative potential anomalies may be flagged in connection with alternative models or in connection with models that receive inputs that have been normalized or otherwise transformed consistent with the present teachings.

In some such embodiments, a parallel output from anomaly models 414 is provided to perform initial or subsequent metamodel training in connection with optional metamodel training module, as depicted in the lower box of FIG. 4. In this module, output from anomaly models 414 are provided to a sunk associated with test data 422, in which data from the production flow are saved with information about associated potential anomalies with associated alert columns at boxes 426 and 424. In some embodiments, stored test data 422 contain associated annotations based on evaluation by one or more subject matter experts as denoted in connection with box 428. Resulting data is persisted as part of the model training process and assimilated to stored metamodels 430, which become a future source of production metamodels 416, which are used as described above.

Figure 5:
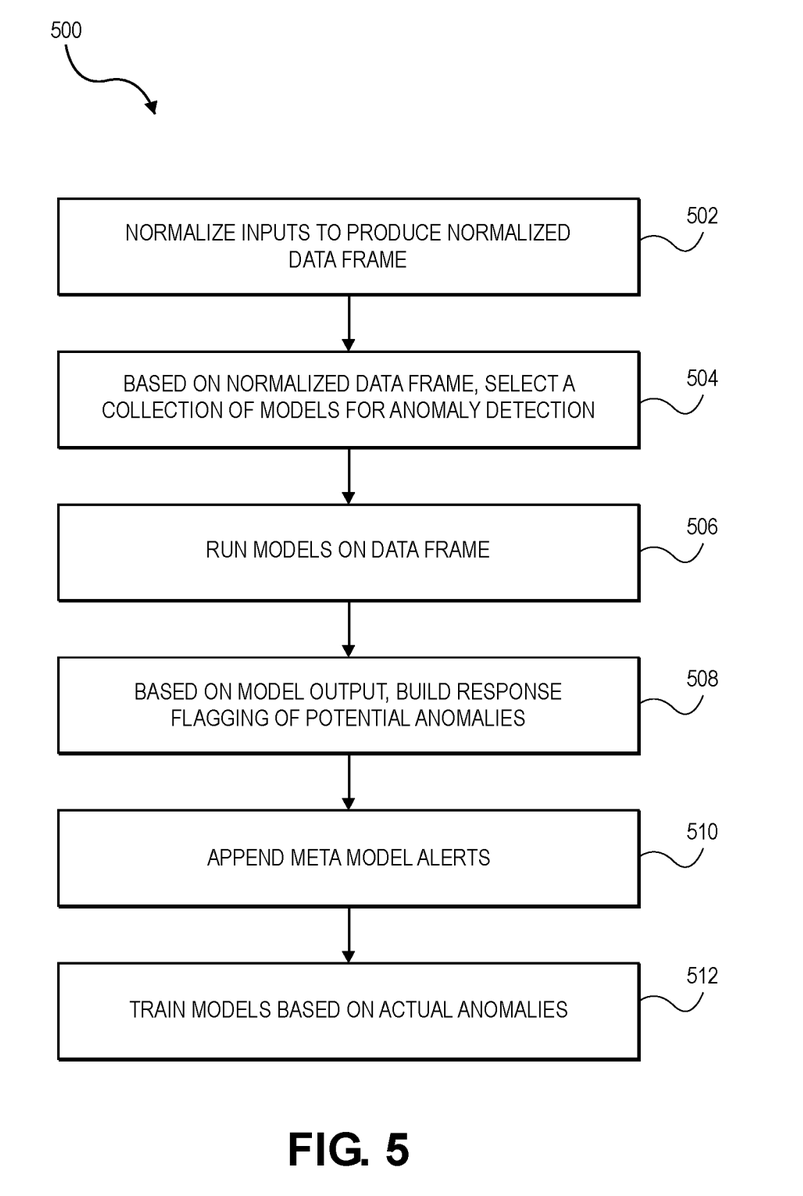
FIG. 5 depicts an exemplary flow chart for illustrating the operation of a process in accordance with various embodiments of the invention.

Turning now to FIG. 5, an exemplary flow chart is depicted for illustrating the operation of process 500 in accordance with various embodiments of the invention. First, at step 502, inputs are normalized to produce a normalized data frame. In some embodiments, this involves inputting source data and generating a form frame as described in connection with FIG. 2B above. In some embodiments, the form frame is collapsed into a data frame with a data collapser as described above in connection with FIG. 4.

Next at step 504, a collection of anomaly detection models is selected to detect anomalies associated with the data frame. In some embodiments, driverless review may be used to quickly automate the modeling process and produce a large library of models. In some embodiments, for the automatic selection of a machine learning model, a best-fitting neural network may be selected from a plurality of candidate neural networks, the best-fitting neural network providing a best performance based on using known training data in connection with the plurality of candidate neural networks or other anomaly detection models. In some other embodiments, subject-matter expertise is leveraged to prioritize selection of models that are known to provide good results for a particular context such as a particular tax form to be completed with a certain set of non-empty inputs or with input forms having certain line values within a predefined range, such as in the case of a particularly high or low income or other designated parameter.

Next at step 506, at least one of the anomaly detection models is run on the data frame. In some embodiments, multiple models are run on a particular data frame to determine whether an anomaly is detected. In some such embodiments, a certainty factor is associated with the detected anomaly. Such a certainty factor may take the form of a floating point number between 0.0 and 1.0 or otherwise reflect a ratio or percentage associated with a certainty of the detection of a meaningful analysis. An advantage of such a certainty factor is to provide an input to further processing so that a secondary application can make decisions regarding the certainty factor. In some embodiments, the certainty factor can be used to iteratively refine underlying models or selections of models based on training data or subsequent analysis of system outputs. For example, a modeled high certainty factor may be determined to be inaccurate by substantive review of subject matter experts. In such an example, a more correct certainty factor may be provided back to the system in the form of refined training data in order to refine further model training processes so that given similar inputs in the future a more accurate certainty factor will be output by the system.

Next, at step 508, a response is built or otherwise generated, flagging potential anomalies based on one or more of the anomaly detection models. In some embodiments, the response is a JSON object. In some embodiments, applying the automatically identified review model to the set of normalized inputs includes further applying a set of subsequent review models to the set of normalized inputs to determine whether a subsequent review model in the set of subsequent review models detects a subsequent anomaly. Next, at step 510 metamodel alerts are optionally appended to the response that is generated at step 508 above. Finally, models are optionally further trained based on actual anomalies or based on a review of anomalies detected in connection with process 500.

In one use case, client transcripts (in HTML format) are converted to JSON and sent to a form frame processor for standardization and normalization of form frame data. Next, the resulting form frames are processed according to the present teachings such that each output line is modeled for protentional errors. Resulting output is a JSON object with messages regarding which lines are higher or lower than expected. In some embodiments, return review models are trained on subject-matter expert feedback from transcript reviews for a particular tax season, so that errors which typically do not result in a recommendation to amend will not be used in model training.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for applying a computer-implemented model to a table of computed values to identify one or more anomalies in the table of the computed values, the method comprising:

receiving one or more input forms, each of the one or more input forms comprising a plurality of input form field values,  wherein each of the one or more input forms is text-based ad-hoc, arbitrary, non-preprocessed tax data corresponding to a particular set of input forms belonging to a particular taxpayer;

automatically parsing the plurality of input form field values into a set of computer-generated candidate standard field values;

automatically normalizing the set of computer-generated candidate standard field values into a set of normalized field values, based on a computer-automated input normalization model,  wherein the computer-automated input normalization model normalizes the set of computer-generated candidate standard field values based on one or more of: metadata based on existing known-correct tax returns or regulatory agency data sources;

applying an automated review model controller to automatically select a review model to apply to the set of normalized field values, based on a predetermined one or more target field values in the set of normalized field values, the review model being selected based on a best-fitting neural network providing a best performance based on iteratively applying known training data and evaluating performance of the review model in connection with the known training data;

applying the review model to the set of normalized field values;

in response to detecting the one or more anomalies in the set of normalized field values, flagging a detected anomalous field value in the set of normalized field value; and  responsive to flagging the detected anomalous field value, predicting a subject matter expert recommendation based on the detected anomalous field value.

2. The one or more non-transitory computer-readable media of claim 1, wherein the best-fitting neural network is selected from a plurality of candidate neural networks, the best-fitting neural network providing the best performance based on using the known training data in connection with the plurality of candidate neural networks.

3. The one or more non-transitory computer-readable media of claim 1, the method further comprising:

providing one or more predetermined known target field values to the automated review model controller; and  in response to determining that the review model is not a known correct review model, updating review model metadata associated with the automated review model controller to enable the automated review model controller to identify the known correct review model.

4. The one or more non-transitory computer-readable media of claim 1, wherein the method further comprises:

collapsing the set of normalized field values into one or more data frames; and  applying the review model to the one or more data frames to flag an alternative possible anomaly.

5. The one or more non-transitory computer-readable media of claim 1, wherein applying the review model to the set of normalized field values further comprises:

further applying a set of subsequent review models to the set of normalized field values to determine whether a subsequent review model in the set of subsequent review models detects a subsequent anomaly.

6. The one or more non-transitory computer-readable media of claim 5, wherein the set of subsequent review models are trained on actual anomalies received as training data.

7. A method for applying a computer-implemented model to a table of computed values to identify one or more anomalies in the table of the computed values, the method comprising:

receiving one or more input forms, each of the one or more input forms comprising a plurality of input form field values,  wherein each of the one or more input forms is text-based ad-hoc, arbitrary, non-preprocessed tax data corresponding to a particular set of input forms belonging to a particular taxpayer;

automatically parsing the plurality of input form field values into a set of computer-generated candidate standard field values;

automatically normalizing the set of computer-generated candidate standard field values into a set of normalized field values, based on a computer-automated input normalization model,  wherein the computer-automated input normalization model normalizes the set of computer-generated candidate standard field values based on one or more of: metadata based on existing known-correct tax returns or regulatory agency data sources;

applying an automated review model controller to automatically select a review model to apply to the set of normalized field values, based on a predetermined one or more target field values in the set of normalized field values, the review model being selected based on a best-fitting neural network providing a best performance based on iteratively applying known training data and evaluating performance of the review model in connection with the known training data;

applying the review model to the set of normalized field values;

in response to detecting the one or more anomalies in the set of normalized field values, flagging a detected anomalous field value in the set of normalized field value; and  responsive to flagging the detected anomalous field value, predicting a subject matter expert recommendation based on the detected anomalous field value.

8. The method of claim 7, wherein the best-fitting neural network is selected from a plurality of candidate neural networks, the best-fitting neural network providing the best performance based on using the known training data in connection with the plurality of candidate neural networks.

9. The method of claim 7 further comprising:

providing one or more predetermined known target field values to the automated review model controller; and  in response to determining that the review model is not a known correct review model, updating review model metadata associated with the automated review model controller to enable the automated review model controller to identify the known correct review model.

10. The method of claim 7, further comprising:

collapsing the set of normalized field values into one or more data frames; and  applying the review model to the one or more data frames to flag an alternative possible anomaly.

11. The method of claim 7, wherein applying the review model to the set of normalized field values further comprises:
further applying a set of subsequent review models to the set of normalized field values to determine whether a subsequent review model in the set of subsequent review models detects a subsequent anomaly.

12. The method of claim 11, wherein the set of subsequent review models are trained on actual anomalies received as training data.

13. A system comprising at least one processor and at least one non-transitory memory storing computer executable instructions that when executed by the at least one processor cause the system to carry out actions comprising:
receiving one or more input forms, each of the one or more input forms comprising a plurality of input form field values,
wherein each of the one or more input forms is text-based ad-hoc, arbitrary, non-preprocessed tax data corresponding to a particular set of input forms belonging to a particular taxpayer;
automatically parsing the plurality of input form field values into a set of computer-generated candidate standard field values;
automatically normalizing the set of computer-generated candidate standard field values into a set of normalized field values, based on a computer-automated input normalization model,
wherein the computer-automated input normalization model normalizes the set of computer-generated candidate standard field values based on one or more of: metadata based on existing known-correct tax returns or regulatory agency data sources;
applying an automated review model controller to automatically select a review model to apply to the set of normalized field values, based on a predetermined one or more target field values in the set of normalized field values, the review model being selected based on a best-fitting neural network providing a best performance based on iteratively applying known training data and evaluating performance of the review model in connection with the known training data;
applying the review model to the set of normalized field values;
in response to detecting the one or more anomalies in the set of normalized field values, flagging a detected anomalous field value in the set of normalized field value; and
responsive to flagging the detected anomalous field value, predicting a subject matter expert recommendation based on the detected anomalous field value.

14. The system of claim 13, wherein the best-fitting neural network is selected from a plurality of candidate neural networks, the best-fitting neural network providing the best performance based on using the known training data in connection with the plurality of candidate neural networks.

15. The system of claim 14, the actions further comprising:
providing one or more predetermined known target field values to the automated review model controller; and
in response to determining that the review model is not a known correct review model, updating review model metadata associated with the automated review model controller to enable the automated review model controller to identify the known correct review model.

16. The system of claim 15, wherein applying the review model to the set of normalized field values further comprises:
further applying a set of subsequent review models to the set of normalized field values to determine whether a subsequent review model in the set of subsequent review models detects a subsequent anomaly.

17. The system of claim 16, wherein the set of subsequent review models are trained on actual anomalies received as training data.

18. The one or more non-transitory computer-readable media of claim 1, further comprising:
responsive to detecting the one or more anomalies in the set of normalized field values, determining a certainty factor for the one or more anomalies, wherein the certainty factor is a ratio or percentage associated with a level of certainty of detection of an anomaly.

19. The method of claim 7 further comprising:
responsive to detecting the one or more anomalies in the set of normalized field values, determining a certainty factor for the one or more anomalies, wherein the certainty factor is a ratio or percentage associated with a level of certainty of detection of an anomaly.

20. The system of claim 13, the actions further comprising:
responsive to detecting the one or more anomalies in the set of normalized field values, determining a certainty factor for the one or more anomalies, wherein the certainty factor is a ratio or percentage associated with a level of certainty of detection of an anomaly.

* * * * *